US010613731B2

(12) United States Patent
Jeon

(10) Patent No.: US 10,613,731 B2
(45) Date of Patent: Apr. 7, 2020

(54) APPARATUS AND METHOD FOR DISPLAYING INFORMATION ON WEB PAGE BASED ON SCROLLING SPEED

(71) Applicant: NAVER CORPORATION, Seongnam-si (KR)

(72) Inventor: Bong Jun Jeon, Seongnam-si (KR)

(73) Assignee: NAVER Corporation, Seongnam-si (KR)

(*) Notice: Subject to any disclaimer, the term of this patent is extended or adjusted under 35 U.S.C. 154(b) by 22 days.

(21) Appl. No.: 14/707,276

(22) Filed: May 8, 2015

(65) Prior Publication Data
US 2015/0324376 A1   Nov. 12, 2015

(30) Foreign Application Priority Data

May 8, 2014 (KR) .......................... 10-2014-0054557

(51) Int. Cl.
G06F 3/0485       (2013.01)
H04L 29/08        (2006.01)
(Continued)

(52) U.S. Cl.
CPC ........ *G06F 3/0485* (2013.01); *G06F 3/04842* (2013.01); *G06F 16/957* (2019.01);
(Continued)

(58) Field of Classification Search
CPC ........................... G06F 3/0485; G06F 17/3089
(Continued)

(56) References Cited

U.S. PATENT DOCUMENTS 5,923,327 A * 7/1999 Smith .................. G06F 3/0481
715/784
6,295,060 B1 * 9/2001 Lentz .................. G06F 3/0482
715/764
(Continued)

FOREIGN PATENT DOCUMENTS

JP    2008-542867    11/2008
JP    2010-107688    5/2010
(Continued)

OTHER PUBLICATIONS

"Speed Up your Site by Lazy Loading Images;" Thad Allender; <http://graphpaperpress.com/tips/speed-up-your-site-by-lazy-loading-images>; Published prior to: Sep. 3, 2012.*
(Continued)

*Primary Examiner* — Stephen S Hong
*Assistant Examiner* — Broderick C Anderson
(74) *Attorney, Agent, or Firm* — Greer Burns & Crain Ltd.

(57) ABSTRACT

Provided is a method of displaying, by a terminal apparatus, a web page, the method including: displaying, on a screen of the terminal apparatus, a web page including a plurality of content regions respectively corresponding to a plurality of pieces of content; obtaining a moving speed of the web page that moves according to a scroll input of a user with respect to the screen of the terminal apparatus; and displaying first information of the plurality of pieces of contents in the plurality of content regions when the moving speed is equal to or higher than a pre-set first speed, and displaying first information and second information of the plurality of pieces of contents in the plurality of content regions when the moving speed is lower than the pre-set first speed.

4 Claims, 16 Drawing Sheets

(51) Int. Cl.
*H04W 8/24* (2009.01)
*G06F 3/0484* (2013.01)
*G06F 16/958* (2019.01)
*G06F 16/957* (2019.01)

(52) U.S. Cl.
CPC ............ *G06F 16/958* (2019.01); *H04L 67/02* (2013.01); *H04W 8/245* (2013.01)

(58) Field of Classification Search
USPC ........................................................ 715/234
See application file for complete search history.

(56) References Cited

U.S. PATENT DOCUMENTS

| | | | | |
|---|---|---|---|---|
| 2002/0033848 | A1* | 3/2002 | Sciammarella | G06F 3/0481 715/838 |
| 2004/0039934 | A1* | 2/2004 | Land | G11B 27/034 726/26 |
| 2005/0206658 | A1* | 9/2005 | Fagans | G06F 3/0481 345/660 |
| 2008/0071810 | A1* | 3/2008 | Casto | G06F 3/0485 |
| 2008/0155475 | A1* | 6/2008 | Duhig | G06F 3/0482 715/830 |
| 2009/0064031 | A1* | 3/2009 | Bull | G06F 3/0485 715/784 |
| 2012/0044251 | A1* | 2/2012 | Mark | G06F 3/0485 345/474 |
| 2012/0064946 | A1* | 3/2012 | Voetberg | H04N 1/00411 455/566 |
| 2014/0337791 | A1* | 11/2014 | Agnetta | G06F 3/0481 715/784 |
| 2015/0345068 | A1* | 12/2015 | Coffman | D06F 58/28 715/771 |
| 2017/0025096 | A1* | 1/2017 | Fan | G06F 3/03543 |

FOREIGN PATENT DOCUMENTS

| | | |
|---|---|---|
| KR | 10-2004-0030013 | 4/2004 |
| KR | 10-1388359 | 4/2014 |
| WO | WO 2006/126050 A1 | 11/2006 |

OTHER PUBLICATIONS

Savage, Josh; "Speed-Dependent Automatic Zooming"; 2002, pp. 1-29, Speed-Dependent Automatic Zooming (Year: 2002).*
Korean Office Action issued in corresponding Korean Patent App. Nos. 2010-107588 & 2008-542867, dated Mar. 9, 2016.
Korean Office Action issued in corresponding Korean Patent App. No. 10-2014-0054557, dated May 14, 2015.

* cited by examiner

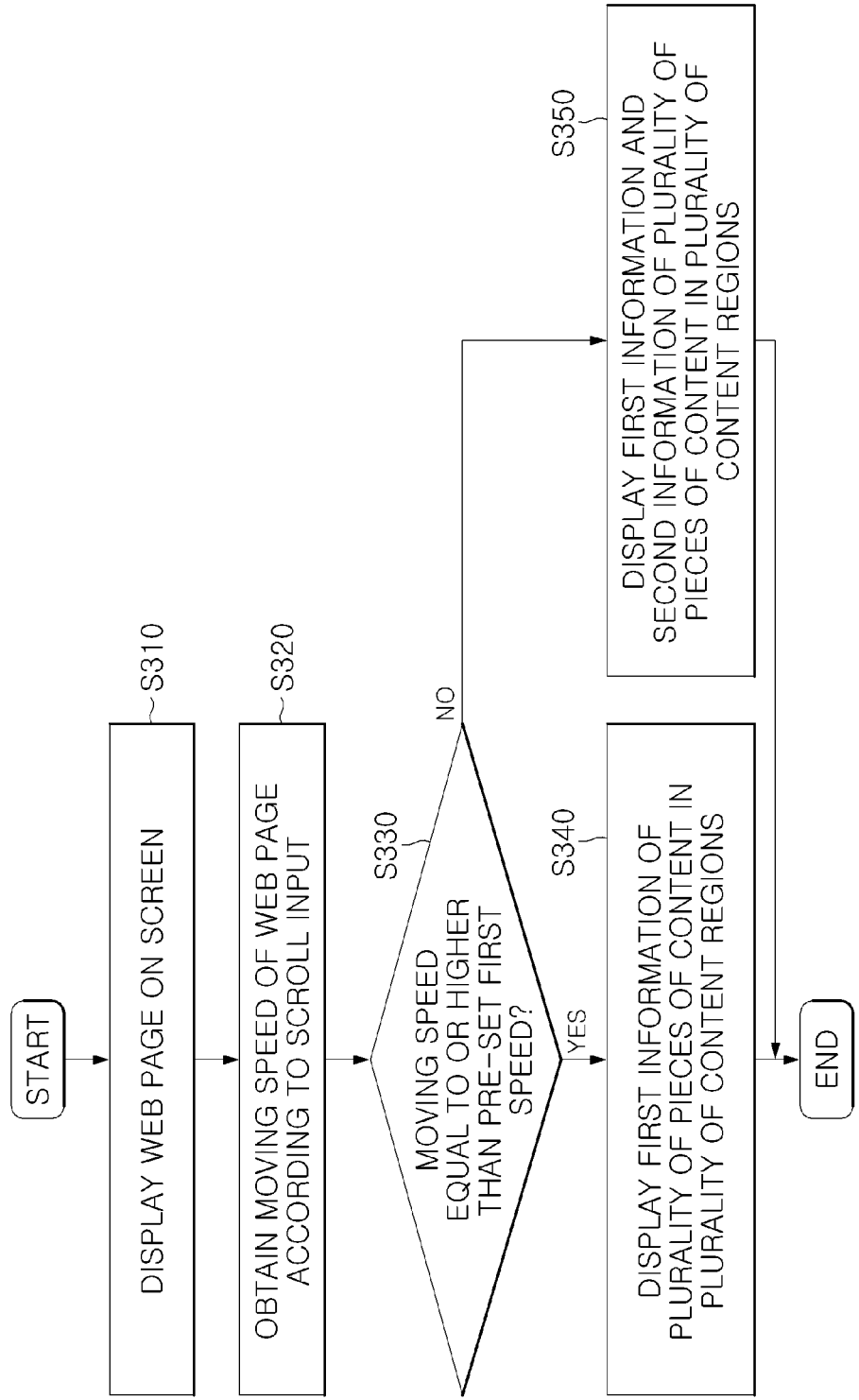

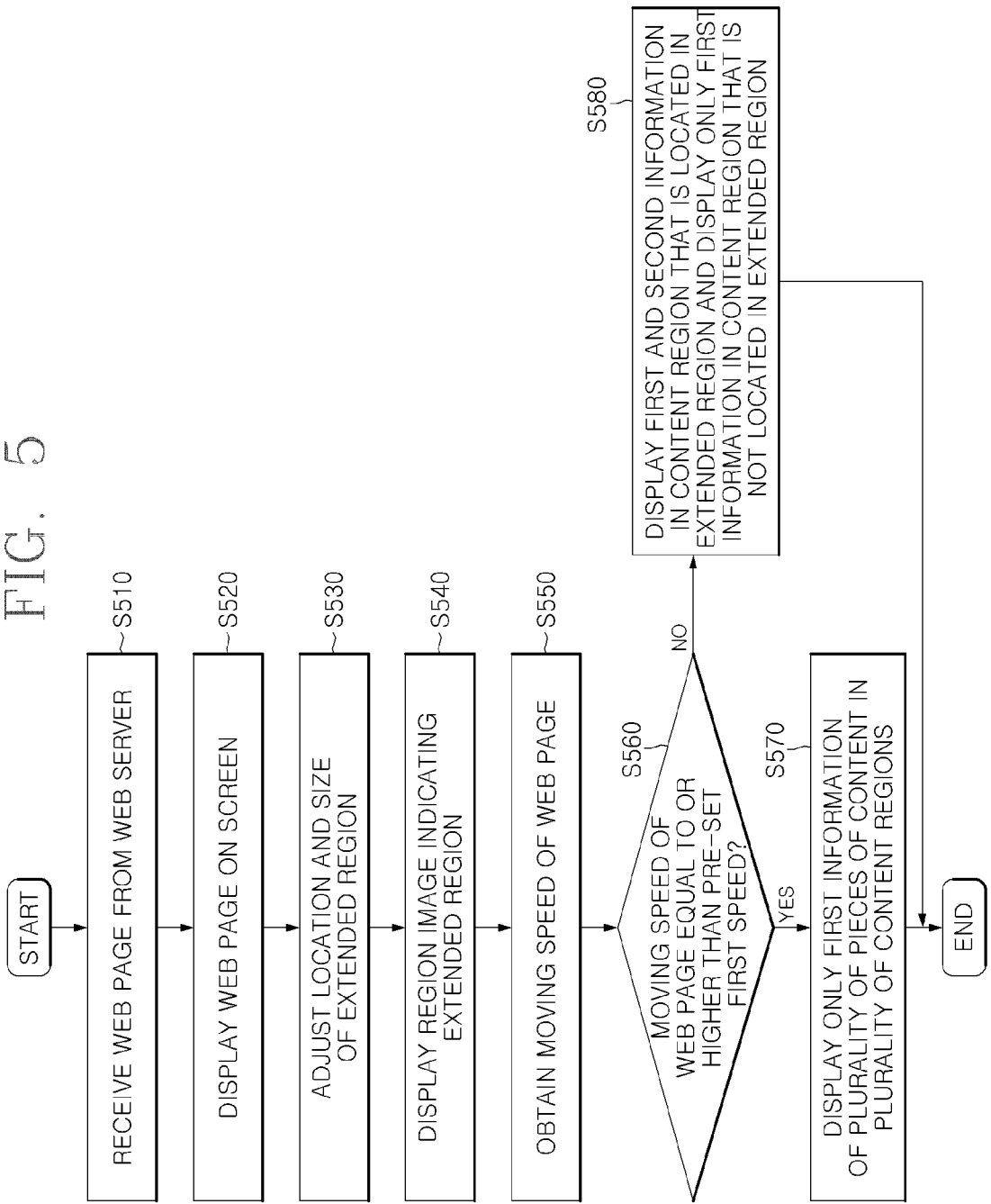

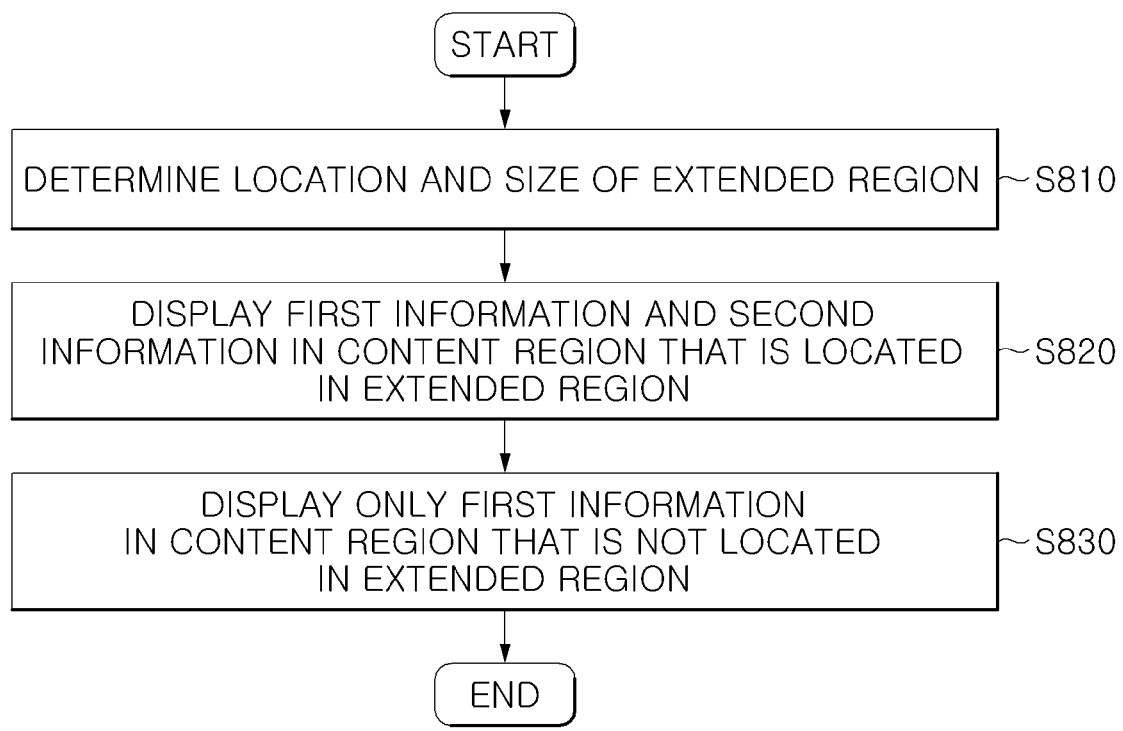

APPARATUS AND METHOD FOR DISPLAYING INFORMATION ON WEB PAGE BASED ON SCROLLING SPEED

RELATED APPLICATION

This application claims the benefit of Korean Patent Application No. 10-2014-0054557, filed on May 8, 2014, in the Korean Intellectual Property Office, the disclosure of which is incorporated herein in its entirety by reference.

BACKGROUND OF THE INVENTION

1. Field of the Invention

The present invention relates to a terminal apparatus and a method of displaying, by the terminal apparatus, a web page, and a web server and a method of providing, by the web server, a web page.

2. Description of the Related Art

Since access to a mobile terminal and access to a network through the mobile terminal have become active, companies operating web servers are providing various services to a user through web pages transmitted to a user terminal.

For example, portal site companies provide various types of information, such as weather, dictionaries, performances, travels, and movies to the user while providing advertising information inducing the user to purchase products or services. The user may search certain type of information through a web page at anytime to obtain desired information.

However, when the user inputs a certain search word into a terminal apparatus in order to obtain desired information, and a web page includes too much information corresponding to the certain search word, it may be difficult for the user to find the desired information from among the information corresponding to the certain search word.

KR 10-2004-0030013 discloses a method of automatically changing a screen image and a banner of a web page, but does not disclose a solution for the user to quickly search information when the web page includes too much information corresponding to the certain search word.

Accordingly, an effective method for the user to easily and conveniently find desired information from a web page is required.

SUMMARY OF THE INVENTION

One or more embodiments of the present invention include a terminal apparatus and a method of displaying, by the terminal apparatus, a web page, and a web server and a method of providing, by the web server, a web page, which enable a user to easily find desired content from among a plurality of pieces of content included in a web page.

One or more embodiments of the present invention include a terminal apparatus and a method of displaying, by the terminal apparatus, a web page, and a web server and a method of providing, by the web server, a web page, which increase user convenience by configuring a web page according to user's intention.

According to one or more embodiments of the present invention, a method of displaying, by a terminal apparatus, a web page, includes: displaying, on a screen of the terminal apparatus, a web page including a plurality of content regions respectively corresponding to a plurality of pieces of content; obtaining a moving speed of the web page that moves according to a scroll input of a user with respect to the screen of the terminal apparatus; and displaying first information of the plurality of pieces of contents in the plurality of content regions when the moving speed is equal to or higher than a pre-set first speed, and displaying first information and second information of the plurality of pieces of contents in the plurality of content regions when the moving speed is lower than the pre-set first speed.

According to one or more embodiments of the present invention, a method of displaying, by a terminal apparatus, a web page, includes: determining a location and a size of an extended region included in a screen of the terminal apparatus; and in the web page including a plurality of content regions respectively corresponding to a plurality of pieces of content, displaying first information and second information of content in a content region that is located in the extended region and displaying first information of content in a content region that is not located in the extended region, from among the plurality of content regions.

According to one or more embodiments of the present invention, a terminal apparatus includes: a display unit configured to display, on a screen, a web page including a plurality of content regions respectively corresponding to a plurality of pieces of contents; a user input receiver configured to receive a scroll input of a user with respect to the screen; a moving speed obtainer configured to obtain a moving speed of the web page moving according to the scroll input of the user; and a controller configured to display first information of each of the plurality of pieces of content in the plurality of content regions when the moving speed is equal to or higher than a pre-set first speed and to display first information and second information of each of the plurality of pieces of content in the plurality of content regions when the moving speed is lower than the pre-set first speed.

According to one or more embodiments of the present invention, a terminal apparatus includes: a display unit configured to display, on a screen, a web page including a plurality of content regions respectively corresponding to a plurality of pieces of content; and a controller configured to determine a location and a size of an extended region included in the screen of the display unit, and to display first information and second information of content in a content region that is located in the extended region and display first information of content in a content region that is not located in the extended region, from among the plurality of content regions.

According to one or more embodiments of the present invention, a method of providing, by a web server, a web page, includes: receiving a request for the web page from a terminal apparatus; and transmitting the web page including a plurality of content regions respectively corresponding to a plurality of pieces of contents to the terminal apparatus according to the request from the terminal apparatus, wherein, while the web page is displayed on a screen of the terminal apparatus, the web page controls the terminal apparatus to display first information of each of the plurality of pieces of content in the plurality of content regions when a moving speed of the web page moving according to a scroll input of a user with respect to the screen of the terminal apparatus is equal to or higher than a pre-set first speed, and to display first information and second information of each of the plurality of pieces of content in the plurality of content regions when the moving speed is lower than the pre-set first speed.

According to one or more embodiments of the present invention, a method of providing, by a web server, a web page, includes: receiving a request for the web page from a terminal apparatus; and transmitting the web page including a plurality of content regions respectively corresponding to a plurality of pieces of content to the terminal apparatus according to the request from the terminal apparatus, wherein, while the web page is displayed on a screen of the terminal apparatus, the web page controls the terminal apparatus to display first information and second information of content in a content region that is located in an extension region and to display first information in a content region that is not located in the extended region, from among the plurality of content regions.

According to one or more embodiments of the present invention, a web server includes: a receiver configured to receive a request for a web page from a terminal apparatus; and a transmitter configured to transmit the web page including a plurality of content regions respectively corresponding to a plurality of pieces of contents to the terminal apparatus according to the request from the terminal apparatus, wherein, while the web page is displayed on a screen of the terminal apparatus, the web page controls the terminal apparatus to display first information of each of the plurality of pieces of content in the plurality of content regions when a moving speed of the web page moving according to a scroll input of a user with respect to the screen of the terminal apparatus is equal to or higher than a pre-set first speed, and to display first information and second information of each of the plurality of pieces of content in the plurality of content regions when the moving speed is lower than the pre-set first speed.

According to one or more embodiments of the present invention, a web server includes: a receiver configured to receive a request for a web page from a terminal apparatus; and a transmitter configured to transmit the web page including a plurality of content regions respectively corresponding to a plurality of pieces of contents to the terminal apparatus according to the request from the terminal apparatus, wherein, while the web page is displayed on a screen of the terminal apparatus, the web page controls the terminal apparatus to display first information and second information of content in a content region that is located in an extension region and to display first information in a content region that is not located in the extended region, from among the plurality of content regions.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a flowchart of a method of displaying a web page, according to an embodiment of the present invention;

FIG. 5 is a flowchart of a method of displaying a web page, according to another embodiment of the present invention;

FIG. 8 is a flowchart of a method of displaying a web page, according to another embodiment of the present invention;

Figure 1A:
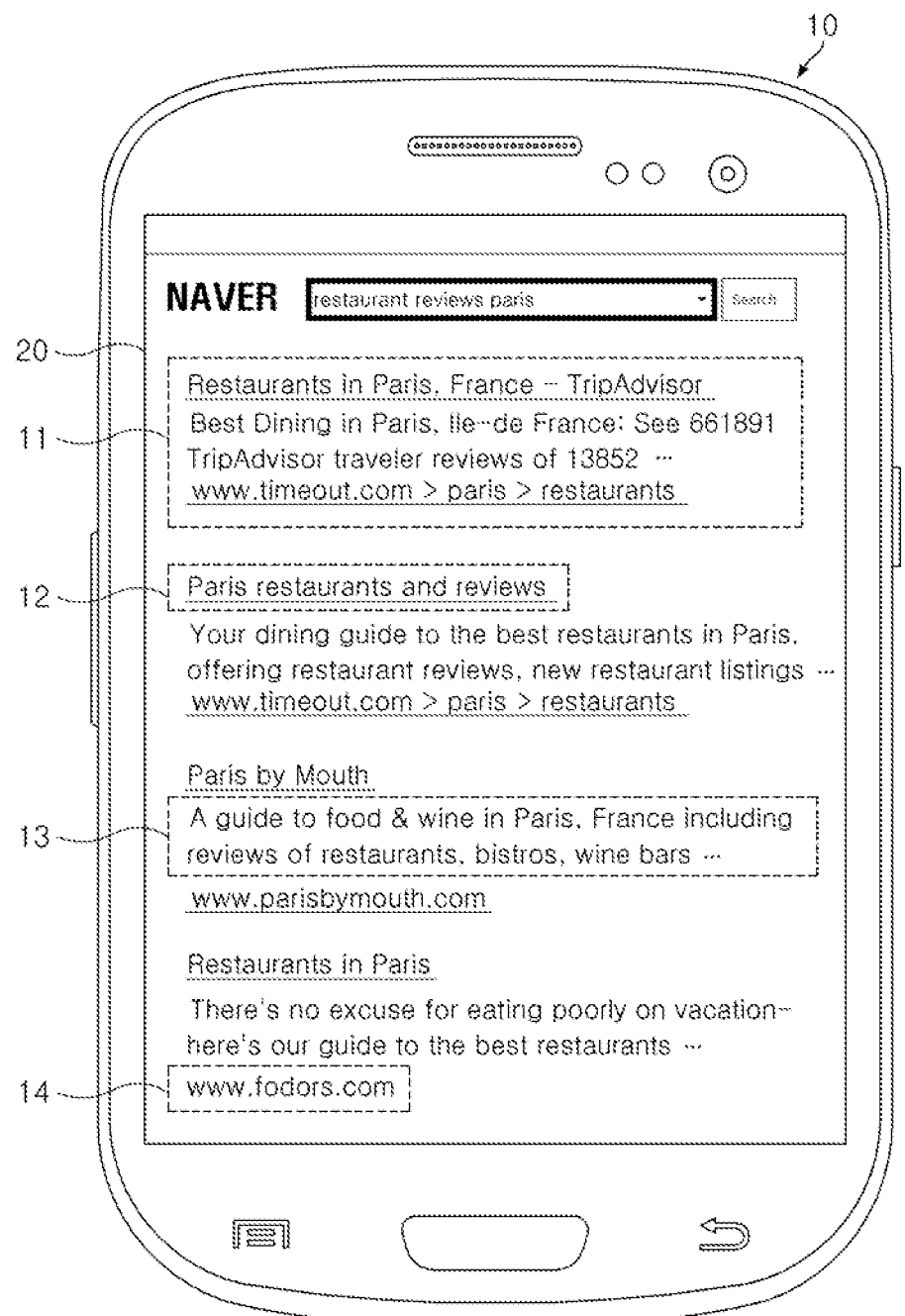
FIG. 1A is a diagram of a web page displayed by a general terminal apparatus.

DESCRIPTION OF THE PREFERRED
EMBODIMENTS

While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims. In drawings, like reference numerals denote like elements.

According to exemplary embodiments of the present invention, the word "unit" may refer to a software component or hardware component such as an FPGA or ASIC capable of carrying out a function or an operation. However, "unit" is not limited to hardware or software. A unit may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units, or further divided into units along with other components.

Figure 1B:
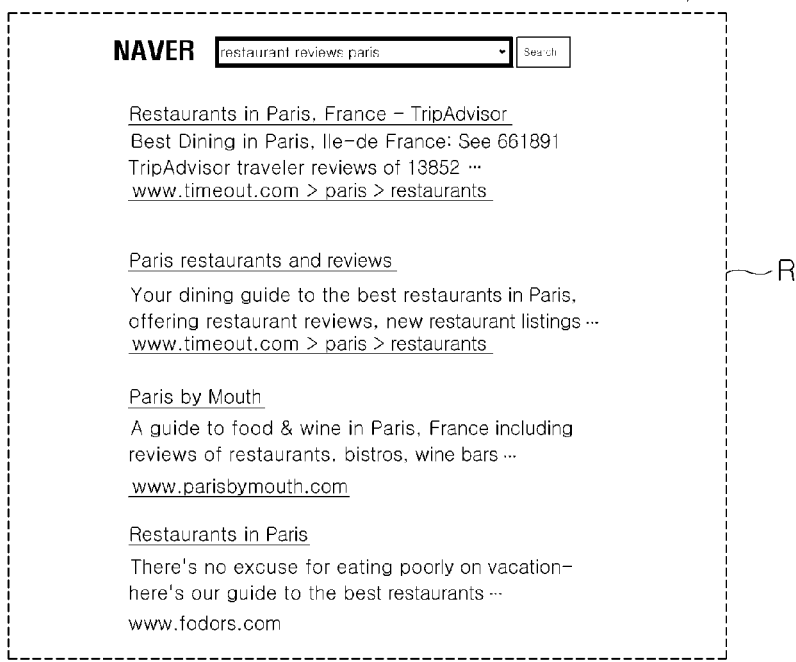
FIG. 1B is a diagram of a web page transmitted from a web server to the general terminal apparatus.

FIG. 1A is a diagram of a web page displayed by a general terminal apparatus 10, and FIG. 1B is a diagram of a web page transmitted from a web server to the general terminal apparatus 10.

As shown in FIG. 1A, the general terminal apparatus 10 may display the web page 20 transmitted from the web server on a screen. The web page 20 transmitted from the web server may include a plurality of content regions 11 respectively corresponding to a plurality of pieces of content, wherein a user may select one of the plurality of content regions 11 and view details about content corresponding to the selected content region 11.

The general terminal apparatus 10 displays, respectively in the plurality of content regions 11, information of the plurality of pieces of content included in the web page 20, for example, title information 12, detail information 13, and address information 14. The user may refer to the title information 12, the detail information 13, and the address information 14 displayed in the content regions 11 to find desired content.

However, as shown in FIG. 1A, if the general terminal apparatus 10 displays the title information 12, the detail information 13, and the address information 14 all in the content regions 11, it may be difficult for the user to find the desired content due to too much information being displayed on the screen. Also, as shown in the web page 20 of FIG. 1B, if the number of pieces of contents included in the web page 20 is very high, only a partial region R of the web page 20 is displayed on the screen of the general terminal apparatus 10 and an overall size of the web page 20 is large, and thus the user has to continuously scroll down to find the desired content.

In this regard, a terminal apparatus and a method of displaying, by the terminal apparatus, a web page, and a web server and a method of providing, by the web server, a web page, according to embodiments of the present invention enable a user to easily and conveniently find desired content from among a plurality of pieces of contents included in a web page.

Figure 2:
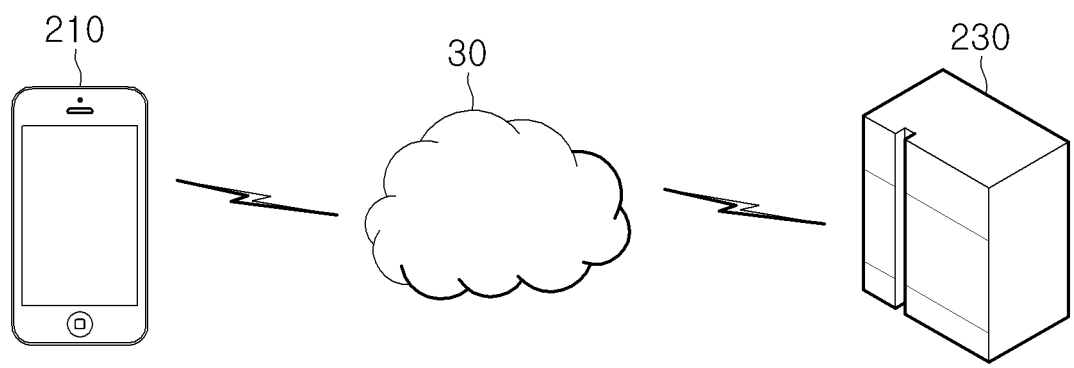
FIG. 2 is a diagram of a terminal apparatus and a web server, according to an embodiment of the present invention.

FIG. 2 is a diagram of a terminal apparatus 210 and a web server 230, according to an embodiment of the present invention.

As shown in FIG. 2, the terminal apparatus 210 and the web server 230 are connected to each other through a network 30. The network 30 may include a wired network and a wireless network, and in detail, the network 30 may include various networks, such as a local area network (LAN), a metropolitan area network (MAN), and a wide area network (WAN). Also, the network 30 may include a well-known world wide web (WWW). However, the network 30 is not limited thereto, and may partially include a well-known wireless data network or a well-known telephone network, and a well-known wired/wireless television network.

The terminal apparatus 210 requests the web server 230 for a web page, and executes the web page transmitted from the web server 230 through a certain application, such as a web browser. The terminal apparatus 210 may receive the web page from the web server 230 based on an address of the web server 230, which is input by a user. The terminal apparatus 210 of FIG. 2 is a smart phone, but the terminal apparatus 210 according to an embodiment of the present invention may be not only a smart phone, but also any terminal apparatus capable of executing a web page, such as a desktop computer, a laptop computer, a personal digital assistant (PDA), a web pad, or a tablet personal computer (PC).

Upon receiving the request for the web page from the terminal apparatus 210, the web server 230 transmits the web page to the terminal apparatus 210.

The terminal apparatus 210 according to an embodiment of the present invention may change configuration of a web page such that the user easily finds desired content, as will be described with reference to FIG. 3.

FIG. 3 is a flowchart of a method of displaying a web page, according to an embodiment of the present invention, wherein the method is performed by the terminal apparatus 210.

In operation S310, the terminal apparatus 210 displays, on the screen of the terminal apparatus 210, a web page including a plurality of content regions respectively corresponding to a plurality of pieces of content. The terminal apparatus 210 receives the web page from the web server 230, and may display, on the screen, the web page by executing the web page through a certain application capable of performing a function of a web browser.

The web page includes the plurality of content regions, wherein information about the plurality of pieces of content may be displayed respectively in the plurality of content regions. A user may refer to the information displayed in the content regions to select one content region and view details about content in the selected content region.

In operation S320, the terminal apparatus 210 obtains a moving speed of the web page moving according to a scroll input of the user with respect to the screen. The terminal apparatus 210 may obtain the moving speed based on the distance and the time a certain point of the web page has moved according to the scroll input.

In operation S330, the terminal apparatus 210 determines whether the moving speed is equal to or higher than a pre-set first speed. The pre-set first speed may be pre-set in the web page.

When the moving speed is equal to or higher than the pre-set first speed, the terminal apparatus 210 displays first information of the plurality of pieces of content in the plurality of content regions, in operation S340. The first information to be displayed in the plurality of content regions may be variously determined. For example, the first information may only include title information of content, or may include title information of content and detail information or image information of content.

When the first information is title information of content and the moving speed is equal to or higher than the pre-set first speed, the terminal apparatus 210 may simply configure the web page by displaying only title information of content in each content region.

When the moving speed is not equal to or higher than the pre-set first speed, i.e., when the moving speed is lower than the pre-set first speed, the terminal apparatus 210 displays first information and second information of the plurality of pieces of contents respectively in the plurality of content regions, in operation S350.

When the first information is title information of content, the second information may include at least one of image information and detail information of the content.

The terminal apparatus 210 according to an embodiment of the present invention may simply configure the web page by displaying only the first information of the plurality of pieces of content respectively in the plurality of content regions when the user quickly scrolls the web page, and may display details about the plurality of pieces of content by displaying not only the first information but also the second information of the plurality of pieces of content respectively in the plurality of content regions when the user relatively slowly scrolls the web page. Accordingly, the user may quickly search for desired content by only using the first information by quickly scrolling the web page, and when the user wants to view details, the user may slowly scroll the web page such that the first and second information are displayed on the screen together.

Figure 4A:
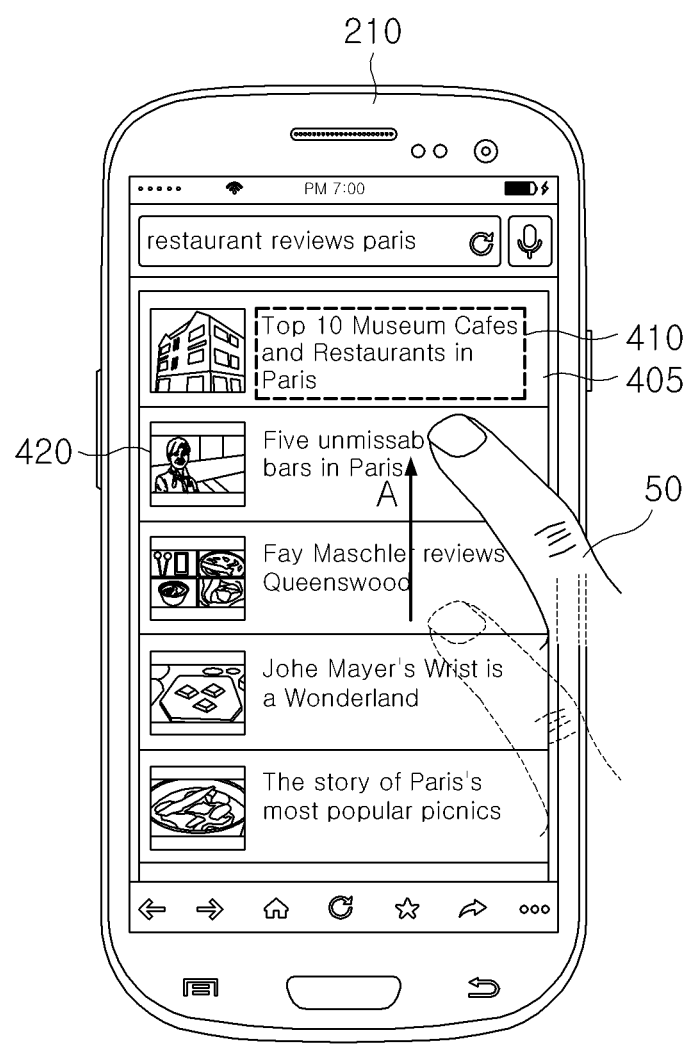
FIGS. 4A and 4B are diagrams of web pages displayed by a terminal apparatus, according to embodiments of the present invention.
Figure 4B:
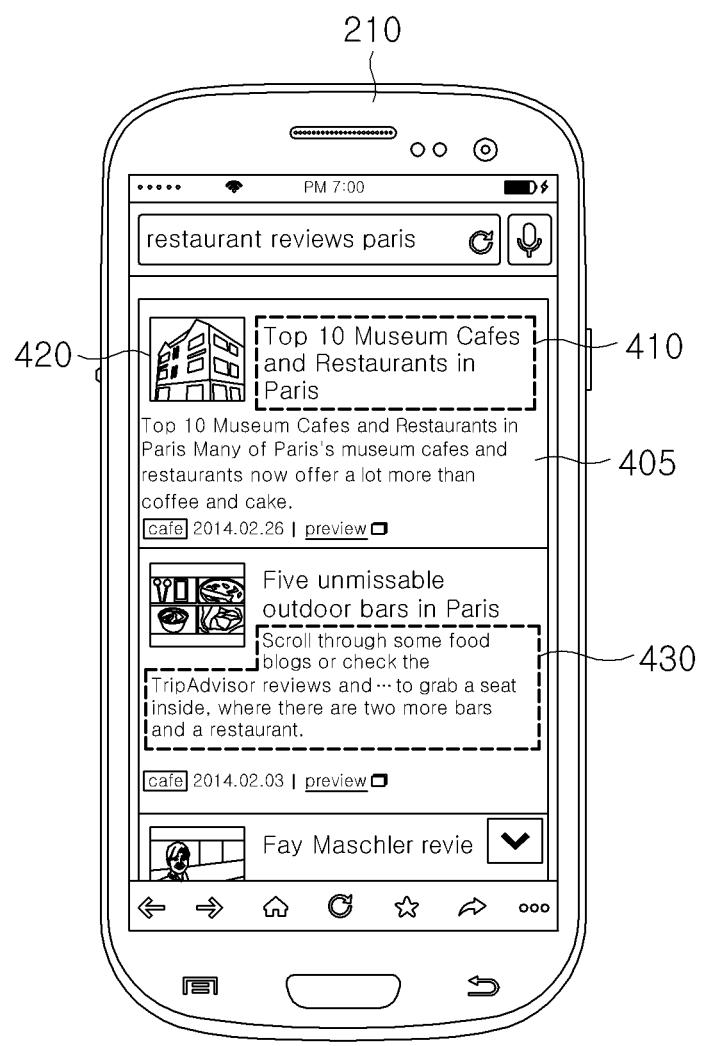

FIGS. 4A and 4B are diagrams of web pages displayed by the terminal apparatus 210, according to embodiments of the present invention, wherein the web page of FIG. 4A is displayed when a moving speed of the web page is equal to or higher than the pre-set first speed, and the web page of FIG. 4B is displayed when the moving speed of the web page is lower than the pre-set first speed.

First, a user 50 may perform a scroll input in any one of various methods. For example, as shown in FIG. 4A, the user 50 may touch the screen of the terminal apparatus 210 and then move the web page in one direction, for example, in a direction indicated by an arrow A, via a drag input. Alternatively, the user 50 may click the screen by using a mouse and then move the web page in one direction via dragging, or may move the web page by moving a scroll bar displayed on the screen.

As described above, when the moving speed of the web page according to the scroll input of the user 50 is equal to or higher than the pre-set first speed, the terminal apparatus 210 may display only first information of a plurality of pieces of content respectively in a plurality of content regions 405. Referring to FIG. 4A, title information 410 and image information 420 are displayed as the first information. The user 50 may quickly move the web page to easily search for desired content by only looking at the title information 410 and the image information 420 as shown in FIG. 4A.

Also, when the moving speed of the web page according to the scroll input of the user 50 is lower than the pre-set first speed, the terminal apparatus 210 may display the first information and second information of the plurality of pieces of content respectively in the plurality of content regions 405. As shown in FIG. 4B, the terminal apparatus 210 may display detail information 430 in the plurality of content regions 405, as the second information.

FIG. 5 is a flowchart of a method of displaying a web page, according to another embodiment of the present invention. Some operations of the method of FIG. 5 may be omitted or a certain operation may be added to the method without departing from technical aspects of the present invention.

In operation S510, the terminal apparatus 210 receives a web page including a plurality of content regions respectively corresponding to a plurality of pieces of content from the web server 230. The terminal apparatus 210 may request the web server 230 for the web page, and the web server 230 may transmit the web page to the terminal apparatus 210 according to the request of the terminal apparatus 210.

In operation S520, the terminal apparatus 210 displays the web page received from the web server 230 on the screen of the terminal apparatus 210. At this time, the terminal apparatus 210 may display only first information of the plurality of pieces of content or display the first information and second information of the plurality of pieces of content, respectively in the plurality of content regions included in the web page. In other words, when the terminal apparatus 210 receives the web page from the web server 230 and initially displays the web page on the screen, information to be displayed in the plurality of content regions may be variously set.

In operation S530, the terminal apparatus 210 adjusts the location and the size of an extended region located in the screen based on a user input. The extended region is a region displaying details of content, and a user may adjust at least one of the location and the size of the extended region.

In operation S540, the terminal apparatus 210 displays a region image indicating the extended region on the screen. In other words, the terminal apparatus 210 may display the region image corresponding to the extended region on the screen to notify the user where the extended region is located in the screen. However, according to other embodiments, the region image may not be displayed on the screen.

In operation S550, the terminal apparatus 210 obtains a moving speed of the web page moving according to a scroll input of the user. As described above, the terminal apparatus 210 may obtain the moving speed of the web page based on the distance and the time a certain point of the web page has moved according to the scroll input.

In operation S560, the terminal apparatus 210 determines whether the moving speed is equal to or higher than the pre-set first speed.

When the moving speed is equal to or higher than the pre-set first speed, the terminal apparatus 210 displays only the first information of the plurality of pieces of content respectively in the plurality of content regions, in operation S570.

When the moving speed is not equal to or higher than the pre-set first speed, i.e., when the moving speed is lower than the pre-set first speed, the terminal apparatus 210 displays the first information and the second information in a content region that is located in the extended region from among the plurality of content regions, and displays only the first information in a content region that is not located in the extended region from among the plurality of content regions, in operation S580.

Generally, the user checks information about content after locating a desired content region at a certain region, for example, a center region of the screen. In this regard, the terminal apparatus 210 according to an embodiment of the present invention locates the extended region in the screen, and display the first information and the second information only in the content region that is located in the extended region, thereby increasing user convenience.

Figure 6A:
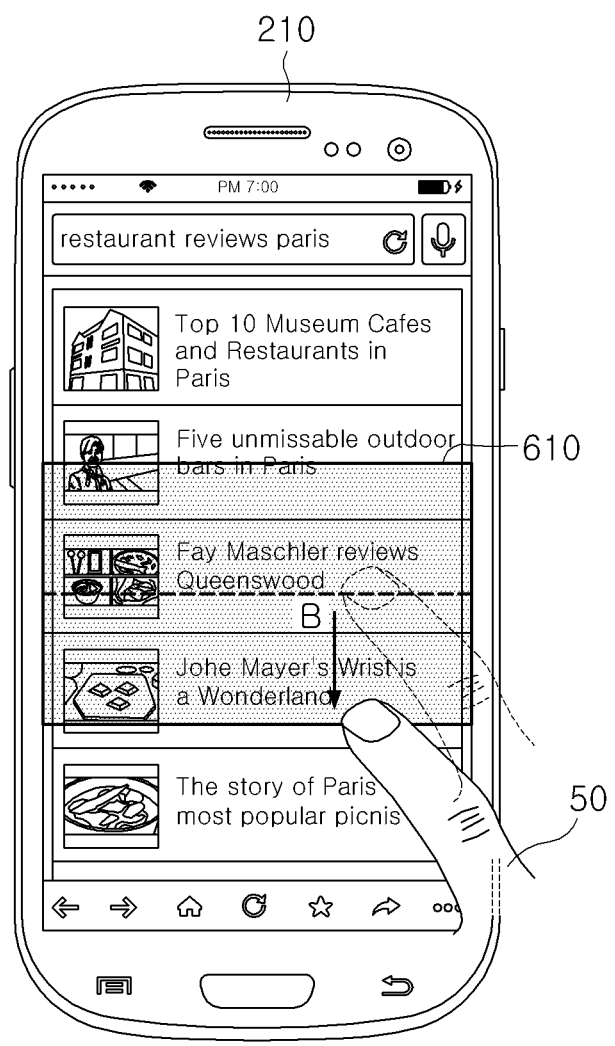
FIG. 6A is a diagram for describing adjusting a size of an extended region by a user.
Figure 6B:
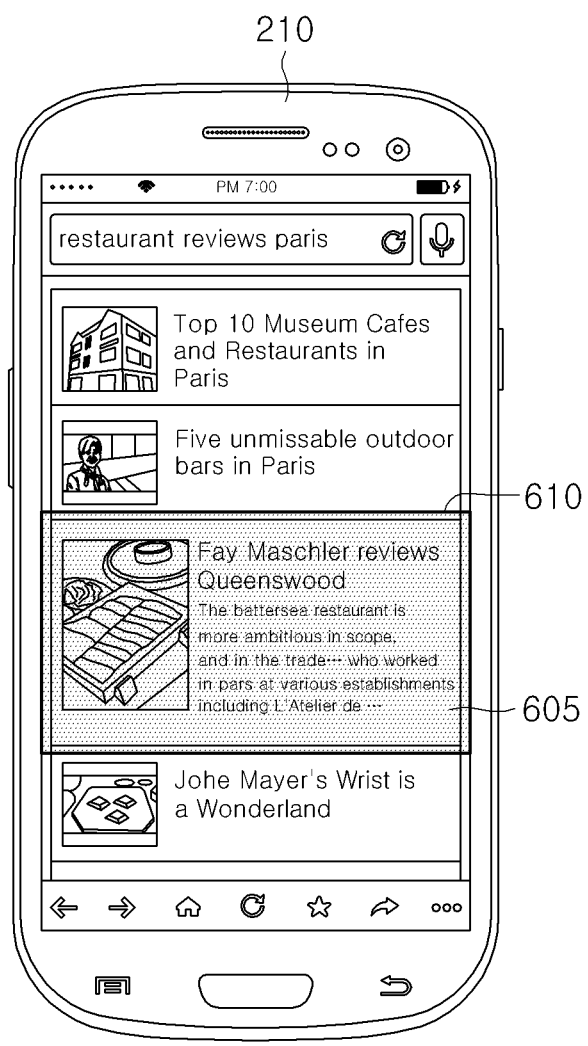
FIG. 6B is a diagram of a web page displayed by a terminal apparatus, according to another embodiment of the present invention.

FIG. 6A is a diagram for describing adjusting the size of an extended region 610 by the user 50, and FIG. 6B is a diagram of a web page displayed by the terminal apparatus 210, according to another embodiment of the present invention.

Referring to FIG. 6A, the terminal apparatus 210 may display a region image indicating the extended region 610 on the screen. The user 50 may adjust a location and a size of the extended region 610 by using any one of various methods. In FIG. 6A, the size of the extended region 610 is adjusted, and here, the user 50 enlarges the size of the extended region 610 by touching one end of the extended region 610 and then dragging the one end in one direction, for example, in a direction indicated by an arrow B. Alternatively, the user 50 may adjust the size of the extended region 610 by inputting a numerical value of the size of the extended region 610 on a setting screen of the terminal apparatus 210.

Also, in order to adjust the location of the extended region 610, the user 50 may change the location of the extended region 610 by long-touching an inner area of the extended region 610 for at least a certain period of time and then dragging the extended region 610 to a desired location.

FIG. 6B illustrates the web page that is displayed on the terminal apparatus 210 when the moving speed of the web page is lower than the pre-set first speed, and the terminal apparatus 210 displays only the first information, for example, image information and title information, in the content region that is not located in the extended region 610. Also, the terminal apparatus 210 may display not only the first information but also the second information, for example, detail information, in a content region 605 that is located in the extended region 610.

A method of determining whether a content region is located in the extended region 610 may vary. For example, it may be determined that a content region is located in an extended region when all of the content region is located in the extended region or when at least 70% of the content region is located in the extended region.

Figure 7A:
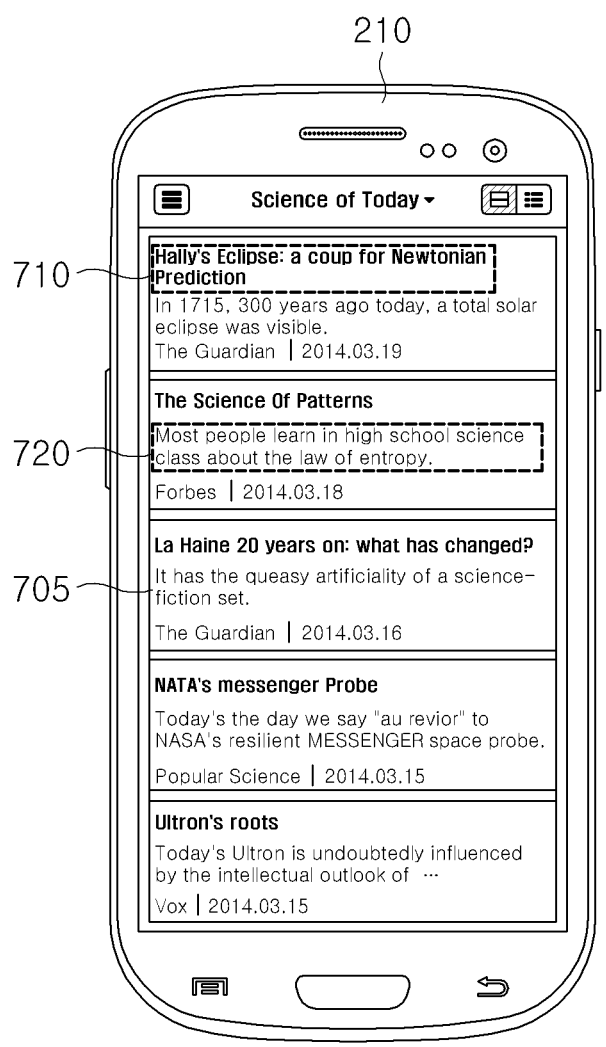
FIGS. 7A through 7C are diagrams of web pages displayed by a terminal apparatus, according to other embodiments of the present invention.
Figure 7B:
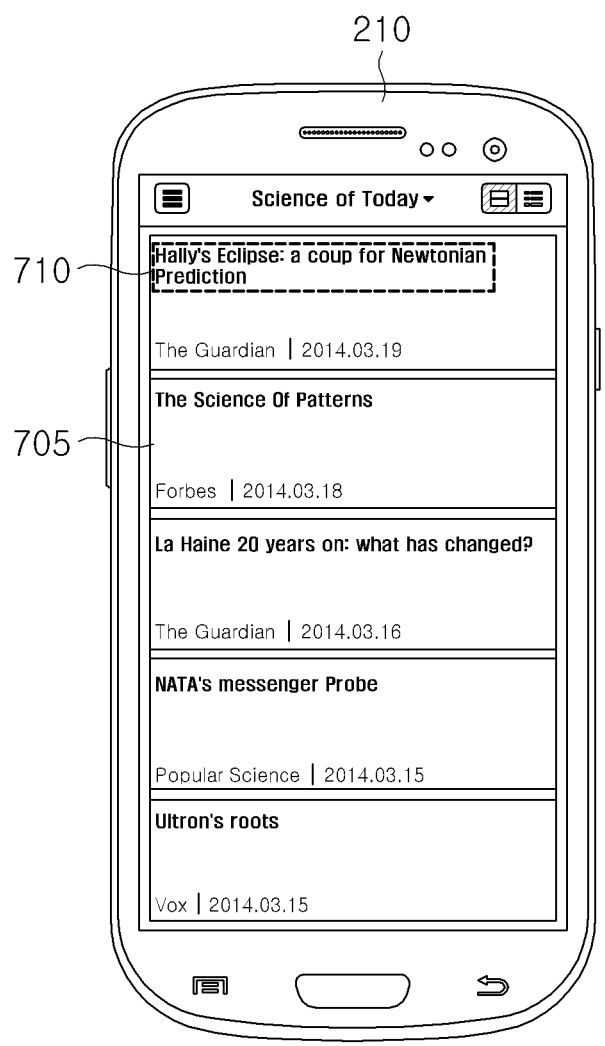
Figure 7C:
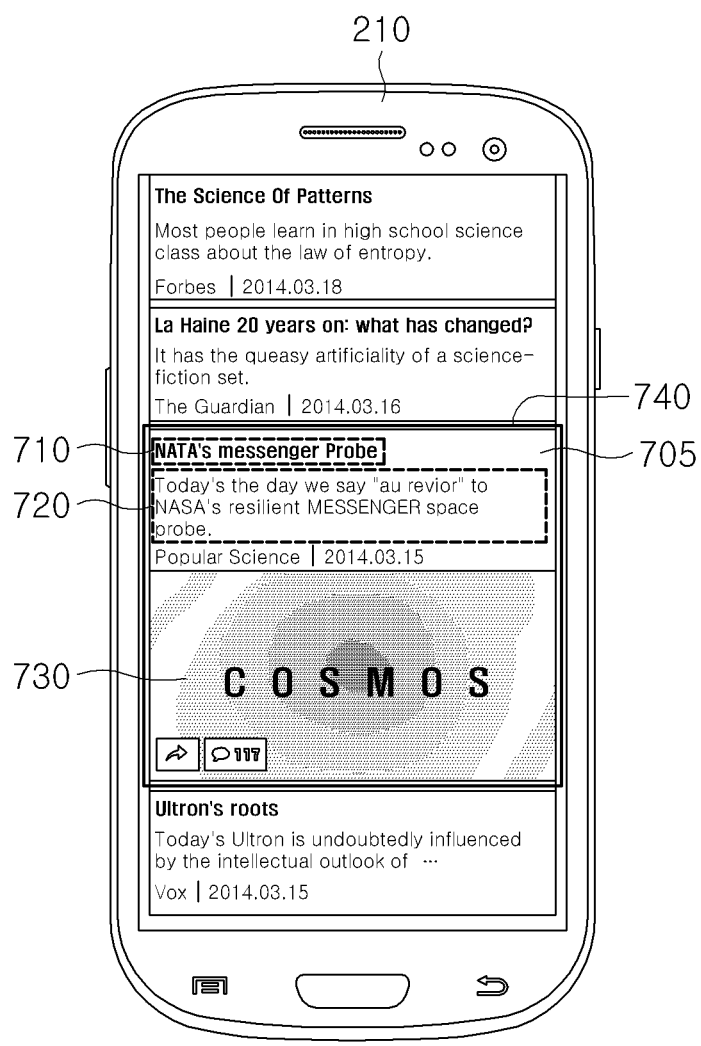

FIGS. 7A through 7C are diagrams of web pages displayed by a terminal apparatus, according to other embodiments of the present invention. Hereinabove, a web page is configured considering whether a moving speed of the web page is equal to or higher than the pre-set first speed, but the web page may be configured by using the pre-set first speed and a pre-set second speed. In other words, the terminal apparatus 210 according to an embodiment of the present invention may variously configure a web page by comparing a moving speed of the web page with a plurality of pre-set speeds.

FIG. 7A illustrates the web page displayed when the moving speed of the web page is equal to or higher than the pre-set first speed, and as shown in FIG. 7A, the terminal apparatus 210 may display, in a plurality of content regions 705, title information 710 and detail information 720 of content as first information.

FIG. 7B illustrates the web page displayed when the moving speed of the web page is equal to or higher than the pre-set second speed that is higher than the pre-set first speed. When the moving speed is very fast, the terminal apparatus 210 according to an embodiment of the present invention may further simply configure the web page by displaying only partial information of the first information in the content region 705. As shown in FIG. 7B, the terminal apparatus 210 may display, in the plurality of content regions 705, only the title information 710 of content as the partial information of the first information.

FIG. 7C illustrates the web page displayed when the moving speed of the web page is lower than the pre-set first speed, wherein the terminal apparatus 210 may display, in the content region 705 located in an extended region 740, the title information 710 and the detail information 720 as the first information, and may additionally display image information 730 as the second information.

FIG. 8 is a flowchart of a method of displaying a web page, according to another embodiment of the present invention. Hereinabove, a web page is configured considering a moving speed of the web page, but in FIG. 8, a web page is configured without considering a moving speed of the web page.

In operation S810, the terminal apparatus 210 determines the location and the size of an extended region included in the screen of the terminal apparatus 210. The location and the size of the extended region may be determined by default, or may be adjusted by a user. Also, according to an embodiment, the terminal apparatus 210 may display a region image corresponding to the extended region on the screen.

In operation S820, the terminal apparatus 210 displays, regarding a web page including a plurality of content regions respectively corresponding to a plurality of pieces of content, first information and second information of content in a content region that is located in the extended region from among the plurality of content regions.

In operation S830, the terminal apparatus 210 displays only first information of content in a content region that is not located in the extended region from among the plurality of content regions.

Generally, a user checks information about content after locating a desired content region at a certain region, for example, a center region of a screen. In this regard, the terminal apparatus 210 according to an embodiment of the present invention locates the extended region in the screen, and display the first information and the second information only in the content region that is located in the extended region, thereby increasing user convenience.

Figure 9:
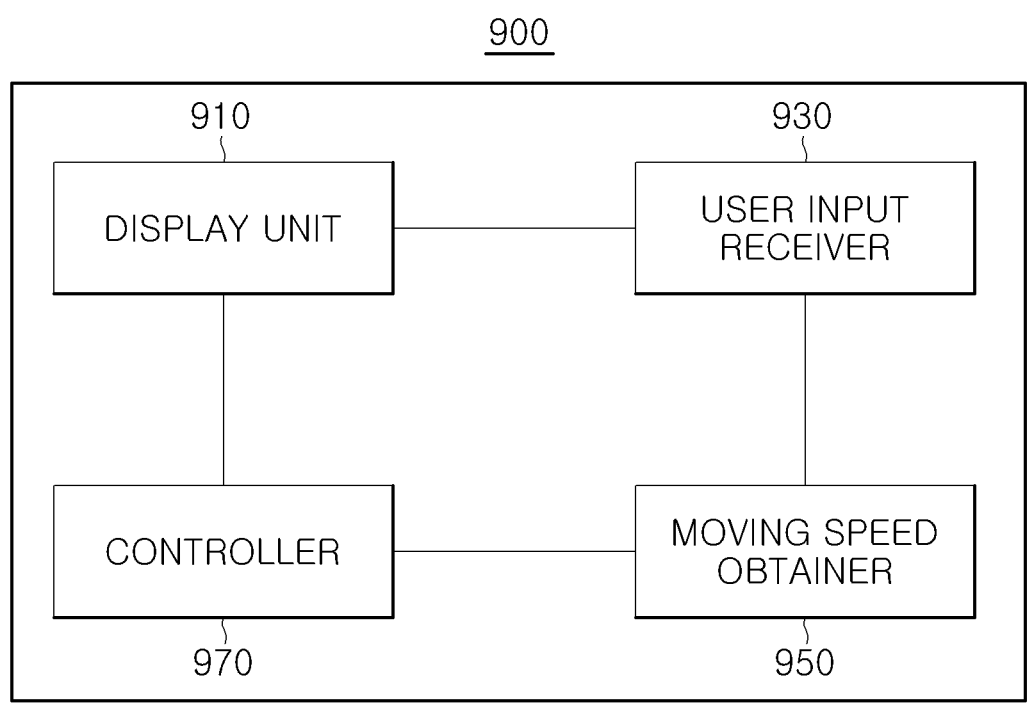
FIG. 9 is a block diagram of a terminal apparatus according to an embodiment of the present invention.

FIG. 9 is a block diagram of a terminal apparatus 900 according to an embodiment of the present invention.

Referring to FIG. 9, the terminal apparatus 900 includes a display unit 910, a user input receiver 930, a moving speed obtainer 950, and a controller 970. The moving speed obtainer 950 and the controller 970 may be configured as a microprocessor.

The display unit 910 displays, on a screen, a web page including a plurality of content regions respectively corresponding to a plurality of pieces of content. The terminal apparatus 900 receives the web page from the web server 230, and may display the web page on the screen of the display unit 910 by using a certain application.

The user input receiver 930 receives a user input with respect to the terminal apparatus 900. In detail, the user input receiver 930 may receive a scroll input of a user with respect to the screen of the display unit 910. The user input receiver 930 may include various input devices capable of receiving a user input, such as a touch screen, a mouse, a keyboard, and a track ball.

The moving speed obtainer 950 obtains the moving speed of the web page moving according to the scroll input. The moving speed obtainer 950 may obtain the moving speed based on the distance and the time a certain point of the web page has moved according to the scroll input. Alternatively, the moving speed obtainer 950 may obtain the moving speed or a scroll speed by using any one of well-known methods.

The controller 970 controls the display unit 910, the user input receiver 930, and the moving speed obtainer 950, and in detail, displays only first information of the plurality of pieces of content respectively in the plurality of content regions when the moving speed is equal to or higher than the pre-set first speed and displays first information and second information of the plurality of pieces of content respectively in the plurality of content regions when the moving speed is lower than the pre-set first speed.

Also, when the moving speed is lower than the pre-set first speed, the controller 970 may display the first information and the second information of content in a content region that is located in an extended region in the screen, and display only the first information of content in a content region that is not located in the extended region. The controller 970 may variously configure a web page displayed on the screen by using not only the pre-set first speed, but also a plurality of pre-set speeds.

Also, the controller 970 may display the first and second information of the content in the content region that is located in the extended region and display only the first information of the content in the content region that is not located in the extended region without considering the moving speed.

Figure 10:
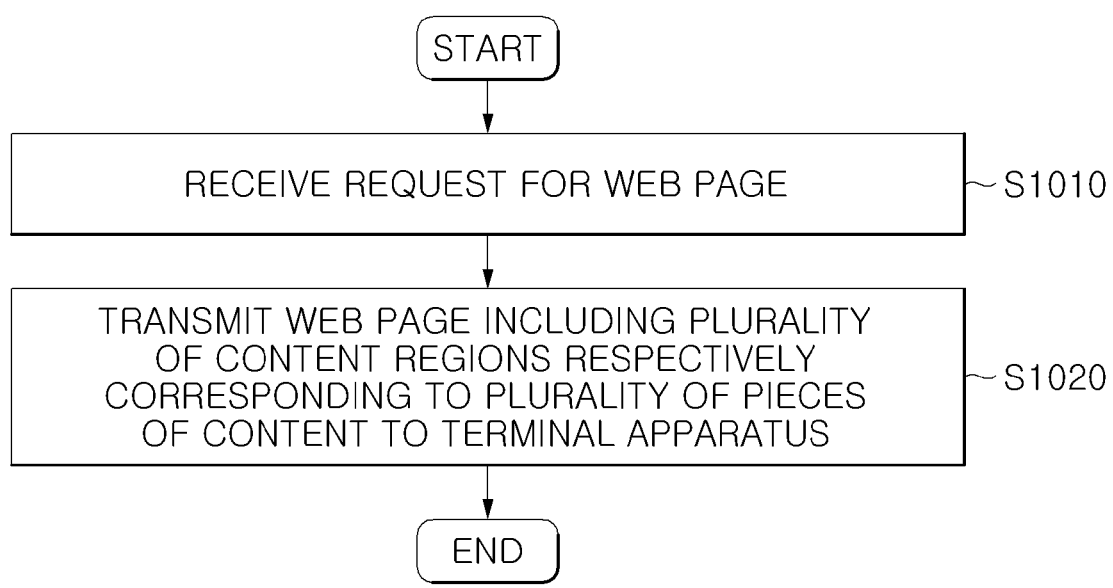
FIG. 10 is a flowchart of a method of providing a web page, according to an embodiment of the present invention.

FIG. 10 is a flowchart of a method of providing a web page, according to an embodiment of the present invention, wherein the method is performed by the web server 230.

In operation S1010, the web server 230 receives a request for a web page from the terminal apparatus 210. The web server 230 may pre-store the web page, wherein the web page may include a plurality of content regions respectively corresponding to a plurality of pieces of content.

In operation S1020, the web server 230 transmits the web page to the terminal apparatus 210 in response to the request received from the terminal apparatus 210. The web page may include request data indicating how the terminal apparatus 210 is to display the web page. For example, the request data of the web page may include information about which information is to be basically displayed in the plurality of content regions and about which information is to be displayed in the plurality of content regions when a moving speed of the web page changes.

For example, while the web page is displayed on the screen of the terminal apparatus 210, the request data of the web page may control the terminal apparatus 210 to display only first information of the plurality of pieces of content respectively in the plurality of content regions when the moving speed according to a scroll input of a user with respect to the screen of the terminal apparatus 210 is equal to or higher than the pre-set first speed, and to display first information and second information of the plurality of pieces of content respectively in the plurality of content regions when the moving speed is lower than the pre-set first speed.

As another example, while the web page is displayed on the screen of the terminal apparatus 210, the request data of the web page may control the terminal apparatus 210 to display first information and second information of content in a content region that is located in an extended region and display only first information of content in a content region that is not located in the extended region, from among the plurality of content regions.

Figure 11:
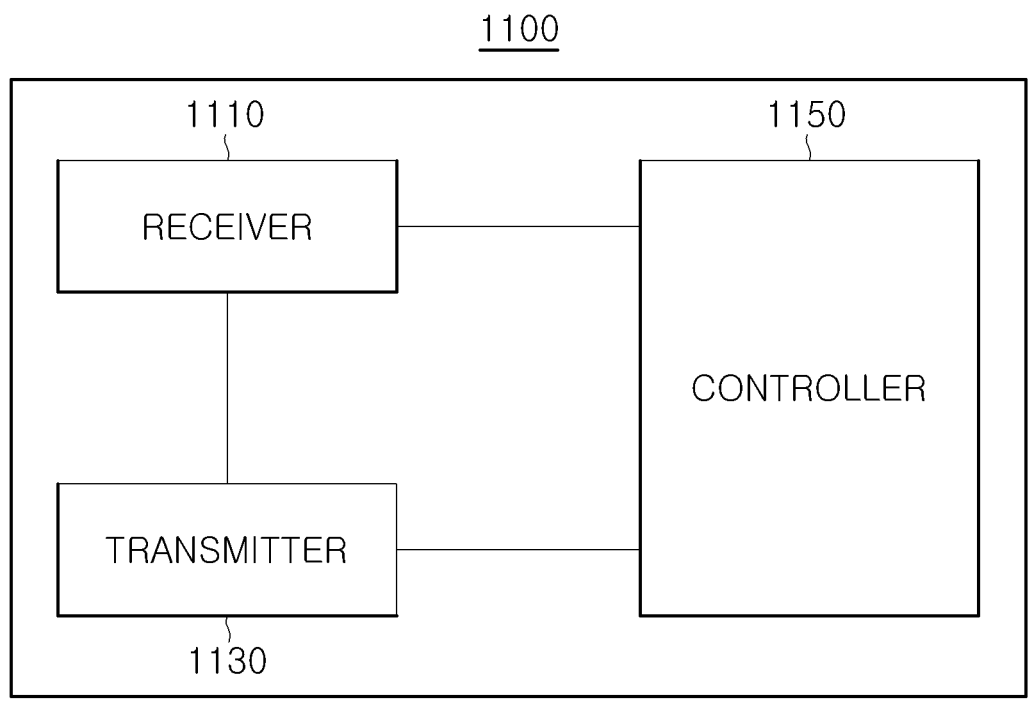
FIG. 11 is a block diagram of a web server according to an embodiment of the present invention.

FIG. 11 is a block diagram of a web server 1100 according to an embodiment of the present invention.

Referring to FIG. 11, the web server 1100 includes a receiver 1110, a transmitter 1130, and a controller 1150.

First, the controller 1150 controls the receiver 1110 and the transmitter 1130, and may be configured as a microprocessor.

The receiver 1110 receives a request for a web page from the terminal apparatus 210. The receiver 1110 may receive the request for the web page from the terminal apparatus 210 that is connected through the network 30 of FIG. 2.

According to the request of the terminal apparatus 210, the transmitter 1130 may transmit a web page including a plurality of content regions respectively corresponding to a plurality of pieces of content to the terminal apparatus 210.

The web page may include request data indicating how the terminal apparatus 210 is to display the web page. For example, the request data of the web page may include information about which information is to be basically displayed in the plurality of content regions and about which information is to be displayed in the plurality of content regions when a moving speed of the web page changes.

For example, while the web page is displayed on the screen of the terminal apparatus 210, the request data of the web page may control the terminal apparatus 210 to display only first information of the plurality of pieces of content respectively in the plurality of content regions when the moving speed according to a scroll input of a user with respect to the screen of the terminal apparatus 210 is equal to or higher than the pre-set first speed, and to display first information and second information of the plurality of pieces of content respectively in the plurality of content regions when the moving speed is lower than the pre-set first speed.

As another example, while the web page is displayed on the screen of the terminal apparatus 210, the request data of the web page may control the terminal apparatus 210 to display first information and second information of content in a content region that is located in an extended region and display only first information of content in a content region that is not located in the extended region, from among the plurality of content regions.

A terminal apparatus and a method of displaying, by the terminal apparatus, a web page, and a web server and a method of providing, by the web server, a web page, according to embodiments of the present invention may enable a user to easily find desired content from among a plurality of pieces of content included in a web page.

Also, a terminal apparatus and a method of displaying, by the terminal apparatus, a web page, and a web server and a method of providing, by the web server, a web page, according to embodiments of the present invention may increase user convenience by configuring a web page according to user's intention.

The embodiments of the present invention can be written as computer programs and can be implemented in digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of displaying a web page by a terminal apparatus, comprising:
   displaying, on a screen of the terminal apparatus, a web page comprising a plurality of content regions respectively corresponding to a plurality of pieces of content, each piece of content including at least first information and second information different from the first information; and
   obtaining a moving speed of the web page that moves according to a scroll input of a user with respect to the screen of the terminal apparatus;
   wherein, when the obtained moving speed is non-zero but lower than a pre-set first speed, first information and second information corresponding to a select piece of content are displayed in a content region that is located in an extended region of the screen, and first information, without second information, of other of the plurality of pieces of content corresponding to other content regions that are not located in the extended region is displayed in the other of the plurality of content regions, wherein the extended region has a display area having a larger size, said larger size being defined by a first distance between opposing upper and lower borders of the extended region displayed on the web page, than a size of a display area of each of the other of the plurality of content regions, said size being defined by a second distance between opposing upper and lower borders of each of the other of the plurality of content regions displayed on the web page, and
   wherein the first information and the second information displayed in the content region located in the extended region are scrolled simultaneously at a non-zero speed and in a same direction on the screen.

2. The method of claim 1, further comprising adjusting at least one of a location and the size of the extended region in the screen based on a user input.

3. The method of claim 2, further comprising displaying, on the screen, a region image indicating the location and the size of the extended region in the screen.

4. A method of displaying, by a terminal apparatus, a web page, the method comprising:
   displaying, on a screen of the terminal apparatus, a web page comprising a plurality of content regions respectively corresponding to a plurality of pieces of content, each piece of content including at least first information and second information different from the first information;
   determining a location and a size of an extended region included in the screen of the terminal apparatus; and
   when an obtained moving speed of the web page is non-zero but lower than a pre-set first speed, displaying first information and second information of content in a content region that is located in the extended region, and displaying first information, without second information, of other of the plurality of pieces of content in corresponding content regions that are not located in the extended region, from among the plurality of content regions, wherein the extended region has a display area having a larger size, said larger size being defined by a first distance between opposing upper and lower borders of the extended region displayed on the web page, than a size of a display area of each of the other of the plurality of content regions, said size being defined by a second distance between opposing upper and lower borders of each of the other of the plurality of content regions displayed on the web page, wherein the first information and the second information displayed in the content region located in the extended region are scrolled simultaneously at a non-zero speed and in a same direction on the screen.

\* \* \* \* \*